(12) United States Patent
Nagasaki

(10) Patent No.: US 11,240,386 B2
(45) Date of Patent: Feb. 1, 2022

(54) SERVER, NON-TRANSITORY COMPUTER-READABLE MEDIUM FOR SERVER, AND METHOD

(71) Applicant: BROTHER KOGYO KABUSHIKI KAISHA, Nagoya (JP)

(72) Inventor: Takeshi Nagasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/215,148

(22) Filed: Mar. 29, 2021

(65) Prior Publication Data

US 2021/0306480 A1 Sep. 30, 2021

(30) Foreign Application Priority Data

Mar. 30, 2020 (JP) .............................. JP2020-061170

(51) Int. Cl.
*H04N 1/08* (2006.01)
*H04N 1/00* (2006.01)
*B41J 2/175* (2006.01)
*G06K 15/00* (2006.01)

(52) U.S. Cl.
CPC ...... *H04N 1/00344* (2013.01); *B41J 2/17546* (2013.01); *G06K 15/402* (2013.01); *H04N 1/0005* (2013.01); *H04N 1/00042* (2013.01)

(58) Field of Classification Search
CPC .......................... H04N 1/00344; B41J 2/17546
See application file for complete search history.

(56) References Cited

U.S. PATENT DOCUMENTS

2016/0292550 A1* 10/2016 Kawai .................. G03G 15/553
2016/0292772 A1* 10/2016 Nagasaki ............ G06K 15/4075

FOREIGN PATENT DOCUMENTS

JP 2016193592 A 11/2016

* cited by examiner

*Primary Examiner* — Ibrahim Siddo
(74) *Attorney, Agent, or Firm* — Scully, Scott, Murphy & Presser, PC

(57) ABSTRACT

A server is configured to perform: receiving, from a printer, an initiation request for initiating a service, the service being for dispatching a color material cartridge to be installed to the printer; receiving, from the printer, cartridge information indicating a color material cartridge currently installed to the printer; determining whether a first type of color material cartridge is currently installed to the printer, the first type of color material cartridge being used at the service; and in a case where it is determined that the first type of color material cartridge is not currently installed to the printer, outputting a dispatching request causing a dispatching process for dispatching the first type of color material cartridge, wherein the dispatching request is not outputted in a case where it is determined that the first type of color material cartridge is currently installed to the printer.

14 Claims, 3 Drawing Sheets

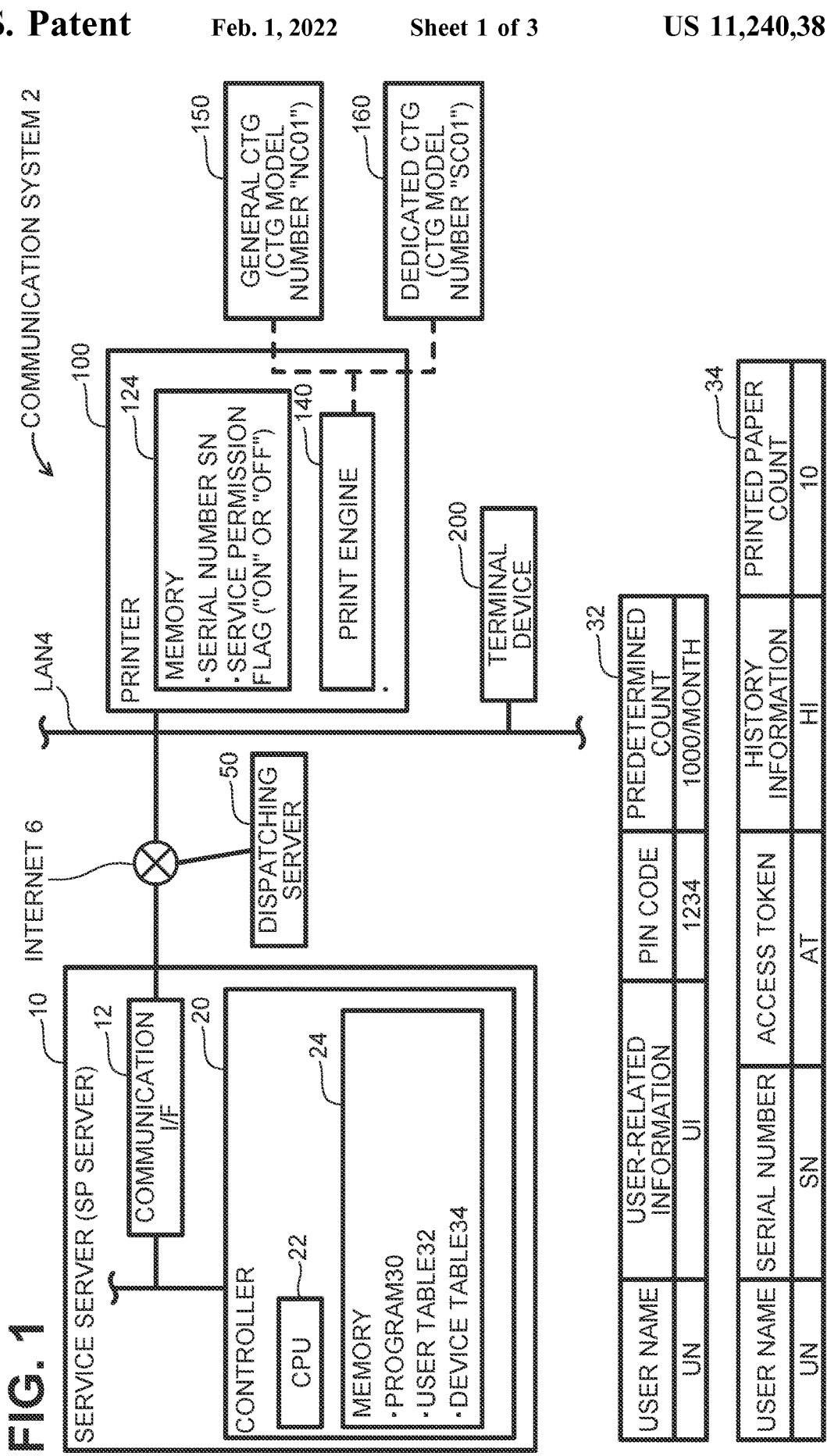

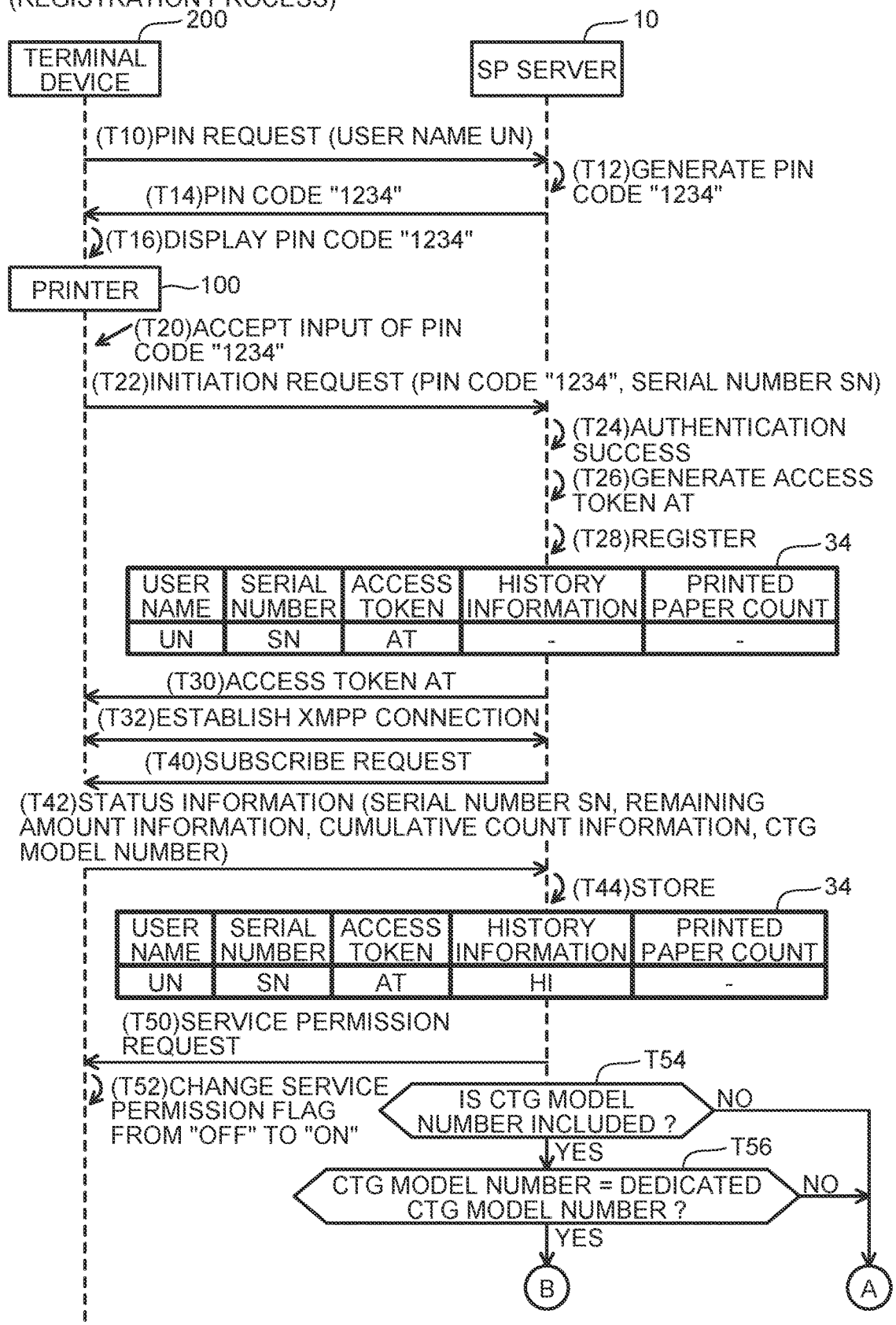

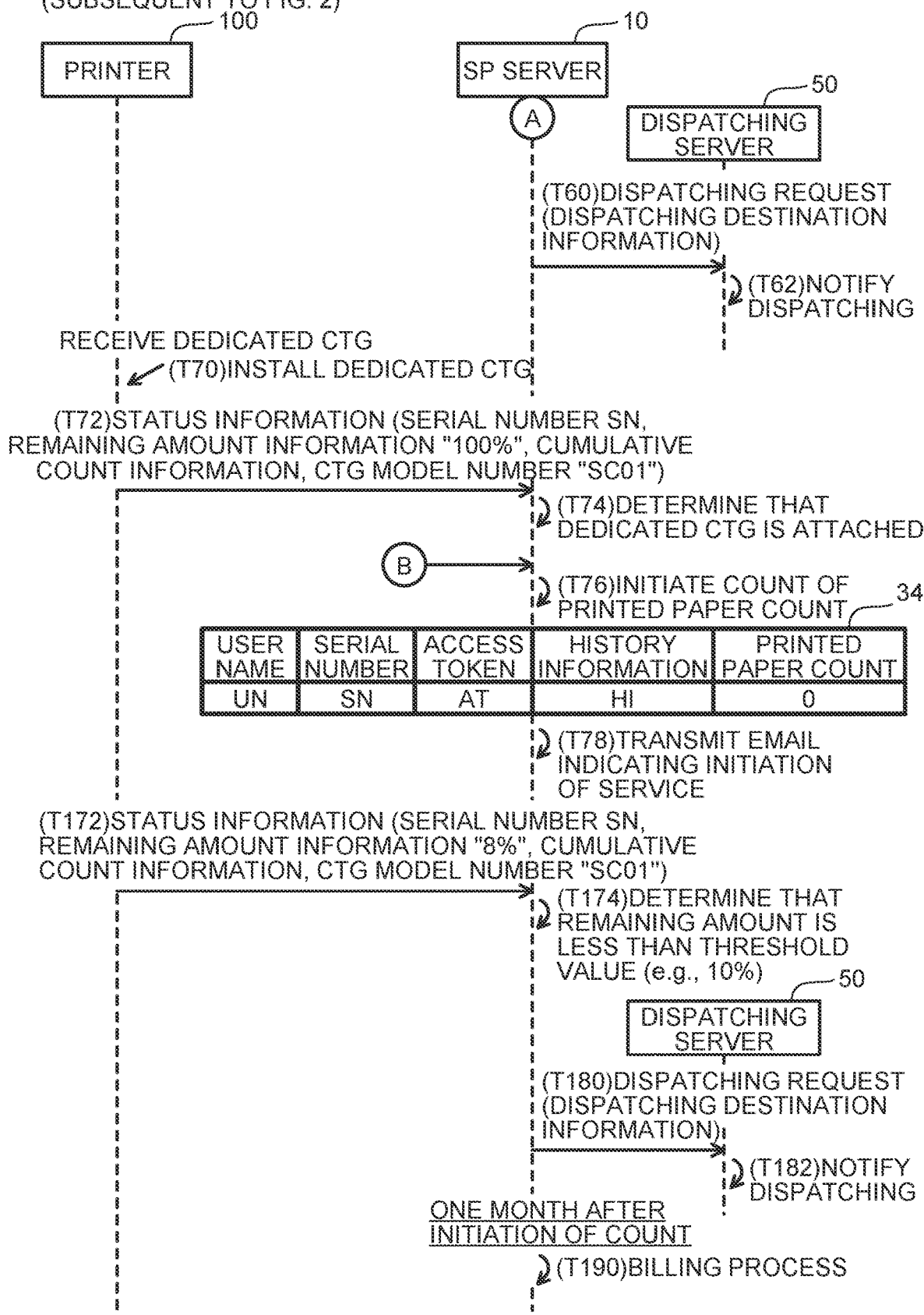

SERVER, NON-TRANSITORY COMPUTER-READABLE MEDIUM FOR SERVER, AND METHOD

CROSS-REFERENCE TO RELATED APPLICATION

This application claims priority from Japanese Patent Application No. 2020-061170 filed on Mar. 30, 2020, the content of which is incorporated herein by reference in its entirety.

TECHNICAL FIELD

In the present specification, the disclosure provides a technique for provision of a service for dispatching a color material cartridge.

BACKGROUND

A server used for providing a flat-rate printing service for a user of a printer is known. The flat-rate printing service includes a dispatching service and a management service. The management service is a service for managing the number of printed pages using a color ink accommodated in a color ink cartridge during a specific period. Purchasing the flat-rate printing service requires the user to pay a flat-rate fee for printing during the specific period. Unless the number of printed pages reaches a predetermined number, the user does not need to pay extra fee. If the number of printed pages exceeds the predetermined number, the user is required to pay an extra fee for printing further pages. The dispatching service is a service for dispatching a color ink cartridge that can be a replacement with a current color ink cartridge in a user's printer under the flat-rate printing service.

In response to purchasing the flat-rate printing service through the user's PC, the server executes certain processes for dispatching a dedicated cartridge which is to be used in the user's printer under the purchased flat-rate printing service.

SUMMARY

Dispatching the dedicated cartridge in response to purchasing the flat-rate printing service may cause the user to hold extra unused cartridges, depending on a timing of purchasing the flat-rate printing service.

According to the present disclosure, the user may not require to hold the extra unused cartridges.

One illustrative aspect of the disclosure may provide a server includes a controller. The controller configured to perform: receiving, from a printer, an initiation request for initiating a service, the service being for dispatching a color material cartridge to be installed to the printer; receiving, from the printer, cartridge information indicating a color material cartridge currently installed to the printer; in response to receiving the initiation request and the cartridge information, determining whether a first type of color material cartridge is currently installed to the printer, the first type of color material cartridge being used at the service; and in a case where it is determined that the first type of color material cartridge is not currently installed to the printer, outputting a dispatching request causing a dispatching process for dispatching the first type of color material cartridge, wherein the dispatching request is not outputted in a case where it is determined that the first type of color material cartridge is currently installed to the printer.

In the above feature, in a case where the server determines that the first type of color material cartridge is not currently installed in the printer in response to receiving the initiation request, the first type of color material cartridge is dispatched to the user. On the other hand, in a case where the server determines that the first type of color material cartridge is currently installed in the printer in response to receiving the initiation request, the first type of cartridge is not dispatched to the user. Therefore, the user may not have to hold an extra first type of color material cartridge.

Another illustrative aspect of the disclosure may provide a method including: transmitting, to a server providing a service, an initiation request for initiating a service, from a printer, the service being for dispatching a color material cartridge to be installed to the printer; determining whether a first type of color material cartridge is currently installed to the printer, the first type of color material cartridge being used at the service; and in a case where the initiation request is transmitted from the server to the printer and where it is determined that the first type of color material cartridge is not currently installed to the printer, outputting a dispatching request causing a dispatching process for dispatching the first type of color material cartridge, wherein the dispatching request is not outputted in a case where it is determined that the first type of color material cartridge is currently installed to the printer.

According to the above method, the user may not require to hold an extra first type of color material cartridge.

Control methods and computer programs for operating the above-described server, and computer-readable storage media storing the computer programs may possess novelty and utility. A communication system including the server and one or more devices (e.g., the printer) may also possess novelty and utility.

BRIEF DESCRIPTION OF THE DRAWINGS

FIG. 1 illustrates a configuration of a communication system.

FIG. 2 is a sequence diagram of a registration process.

FIG. 3 is a sequence diagram subsequent to the sequence diagram of FIG. 2.

DETAILED DESCRIPTION (First Embodiment)
(Configuration of Communication System 2; FIG. 1)
As illustrated in FIG. 1, a communication system 2 includes a service providing server 10 (hereinafter referred to as "SP server 10"), a dispatching server 50, a printer 100 and a terminal device 200. The printer 100 and the terminal device 200 are connected to Local Area Network (LAN) 4. The LAN 4 may be either of wired LAN or wireless LAN. The SP server 10 is enabled to communicate with the printer 100 and the terminal device 200 via the Internet 6 and the LAN 4. The SP server 10 is enabled to communicate with the dispatching server 50 via the Internet 6. The terminal device 200 is a terminal, e.g. a Desktop PC, a tablet PC or a smartphone.

(Configuration of SP Server 10)
The SP server 10 is a server for providing a flat-rate printing service related to printing process. The flat-rate printing service includes a dispatching service for dispatching a color material cartridge to be installed to a printer (e.g., printer 100), and a management service for managing the number of printed pages using a color material (e.g., ink, toner) accommodated in a color material cartridge dispatched by the dispatching service. Hereinafter, "cartridge" may be abbreviated to "CTG".

In the dispatching service, a dispatching request for dispatching a color material CTG is transmitted to the dispatching server 50. Thus, the dispatching server 50 may execute processes for dispatching the color material CTG (e.g., dispatch notification to an operator).

In the management service, whether a printed page count reaches a predetermined count (e.g., 1000) is monitored. The printed page count indicates the number of printed pages during a specific period (e.g., one month). For example, the user may pay a flat-rate fee for printing during the specific period. Unless the printed page count reaches the predetermined count, the user does not need to pay extra fee. In response to that the printed page count reaches the predetermined count, the user pays the extra fee for printing further pages exceeding the predetermined count during the specific period. The extra fee is determined by multiplying the number of exceeded printed pages by a predetermined unit price (e.g., 10 yen per page). In other words, the management service may be a flat-rate service for printing for flat-rate fee before the printed page count reaches the predetermined count, or a pay-as-you-go service for printing further pages after the printed page count exceeds the predetermined count, or in combination. The predetermined count may be determined when the user signs a contract of the flat-rate printing service.

The SP server 10 is set up by a vendor of a printer (e.g., printer 100). The setup allows the SP server 10 to communicate with the Internet 6. Nevertheless, in other embodiments, the SP server 10 may be set up by an operator different from the vendor.

The SP server 10 includes a communication interface 12 and a controller 20. The communication interface 12 and the controller 20 are connected to a bus line (no reference numeral assigned). Hereinafter, "interface" may be abbreviated to "I/F". The communication I/F 12 is connected to the Internet 6 for a communication via the Internet 6. The controller 20 includes a CPU22 and a memory 24. The CPU22 executes various processing in accordance with a program 30 stored in the memory 24. The memory 24 may be at least one of a volatile memory or a nonvolatile memory. The memory 24 is configured to store a user table 32 and a device table 34 as well as the program 30. Nevertheless, in other embodiments, the user table 32 and/or the device table 34 may be stored in an external storage device communicably connected to the SP server 10.

In the user table 32, one or more user information corresponding to one or more users signing up the flat-rate printing service is registered. That is, the user information is stored in the user table 32. Each user information includes a user name (UN) for identifying a user and user-related information (UI) related to the user. The user-related information may include destination information indicating an address where a color material CTG is delivered, email address and credit card information of the user. The user table 32 may also store PIN code (e.g., 1234) and the predetermined count (e.g., 1000) in association with corresponding user information. The PIN code is used for authentication in registering a serial number of a printer into the user table 32.

In the user table 34, one or more device information is registered. Each device information may include a user name (UN), a serial number (SN), access token (AT), history information (HI) and the printed page count. The access token is used for authentication of a communication between a printer 100 and the SP server 10. The history information indicates history of remaining amount of a color material CTG currently installed to the printer.

(Configuration of Printer 100)

The printer 100 is a peripheral device of the terminal device 200. The printer 100 includes a memory 124 and a print engine 140.

The memory 124 is configured to store a serial number SN for identifying the printer 100 and a service permission flag. The service permission flag indicates either of "ON" or "OFF". The "ON" indicates that it is permitted to use a dedicated color material CTG dispatched while the flat-rate printing service is active. The "OFF" indicates that it is not permitted to use the dedicated CTG. The default setting of the service permission flag is "OFF".

The print engine 140 may be either of an inkjet print mechanism or an electrophotographic print mechanism. A color material CTG is configured to be installed to the print engine 140. The color material CTG includes an IC chip. The print engine 140 includes a reader for reading information in the IC chip.

Either of multiple types of cartridges, including a regular CTG 150 and a dedicated CTG 160, may be installed to the print engine 140. The general CTG 150 is a commonly available color material CTG which may be purchased at retail stores or e-commerce. The dedicated CTG 160 is a color material CTG dispatched in response to processes for dispatching by the dispatching server 50 (e.g., the notification of dispatch to the operator) in a case where the above flat-rate printing service is signed up or initiated.

In the IC chip of the general CTG 150, a CTG model number of "nc01" is stored for identifying the general CTG 150. In the IC chip of the dedicated CTG 160, a CTG model number of "sc01" is stored for identifying the dedicated CTG 160.

In this embodiment, the printer 100 executes printing process by using either of the general CTG 150 or the dedicated CTG 160. In a case where the service permission flag is "OFF", the printer 100 executes printing process with the general CTG 150 while printing process with the dedicated CTG 160 is not permitted to execute. On the other hand, in a case where the service permission flag is "ON", the printer 100 executes printing process with the general CTG 150, and also executes printing process with the dedicated CTG 160. Nevertheless, in other embodiments, in a case where the service permission flag is "ON", the printer 100 is not allowed to execute printing process with the general CTG 150 while executing printing process with the dedicated CTG 160.

(Registration Process; FIG. 2 and FIG. 3)

FIG. 2 and FIG. 3 are sequence diagrams of a registration process for registering information in the device table 34. Hereinafter, for easier understanding, each processing executed by CPU of each device (e.g., CPU 22 of the SP server 10) may be described as each processing is executed by each device, instead of each CPU. In the following explanation, communication between the SP server and the dispatching server 50 is performed via the communication I/F 12 and the Internet 6. Communication between the SP server 10 and either of the printer 100 or the terminal device 200 is performed via the communication I/F 12, the Internet 6, and the LAN 4. In the following explanation, unless specifically mentioned, the phrase of "via the communication I/F 12", "via the Internet 6", and "via the LAN 4" may be omitted.

At the initial state in FIG. 2, the user name UN and the user-related information UI are registered in the user table 32 of the SP server 10 as described in FIG. 1. The user name UN and the user-related information UI may be registered in the SP server 10 according to user's operation on the terminal device 200.

In T10, in response to accepting the user's operation for designating a URL of the SP server 10 and the user's operation for inputting the user name UN, the terminal device 200 transmits a PIN request including the user name UN to the SP server 10.

In T12, in response to receipt of the PIN request from the terminal device 200 in T10, the SP server 10 generates a PIN code of "1234", and stores the PIN code of "1234" in the user table 32 in association with the user name UN included in the PIN request. Subsequently, in T14, the SP server 10 transmits the PIN code of "1234" to the terminal device 200.

In T16, in response to receipt of the PIN code of "1234" from the SP server 10 in T14, the terminal device 200 displays the PIN code of "1234". Accordingly, the user can recognize that the user's PIN code is "1234".

In T20, the user inputs the PIN code of "1234" in the printer 100. In T22, in response to accepting an input of the PIN code of "1234" from the user in T20, the printer 100 transmits an initiation request to the SP server 10. The initiation request is a command for requesting a sign up for the above-described flat-rate printing service, and includes the PIN code of "1234" and the serial number SN of the printer 100.

In T24, in response to receipt of the initiation request from the printer 100 in T22, the SP server 10 executes authentication of the PIN code of "1234" included in the initiation request. In this case, in response to comparison between the PIN code of "1234" in the initiation request and the PIN code of "1234" in the user table 32, the SP server 10 determines that the authentication of the PIN code is successful, and determines that the stored user name UN associated with the PIN code of "1234" as a user name for registration. Subsequently, in T26, the SP server 10 generates an access token AT for registration.

In T28, the SP server 10 registers the user name UN determined for registration, the serial number SN included in the initiation request and the generated access token AT in the device table 34 in association with each other. At this moment, the history information and the printed page count are not registered in the device table 34 in association with the user name UN.

In T30, the SP server 10 transmits the access token AT to the printer 100. Thus, the printer 100 stores the access token AT in the memory 124 of the printer 100.

In T32, the printer 100 establishes an eXtensible Messaging and Presence Protocol ("XMPP") connection with the SP server 10 by using the access token AT in the memory 124. The XMPP connection may be maintained until the printer 100 is turned off. By using the XMPP connection, the SP server 10 transmits a request to the printer 100 through a firewall of LAN 4 to which the printer 100 belongs, even though the SP server 10 does not receive a request from the printer 100. In other embodiments, another connection scheme other than the XMPP connection for transmitting the request from the SP server 10 to the printer 100 may also be applicable. For example, Hypertext Transfer Protocol Secure ("HTTPS") connection may be established between the printer 100 and the SP server 10.

In T40, in response to establishing the XMPP connection with the printer 100 in T32, the SP server 10 transmits, to the printer 100, a Subscribe request for requesting the printer to transmit status information indicating a current status of the printer 100 repeatedly. The Subscribe request includes frequency information indicating an interval at which the printer 100 transmits the status information.

In T42, in response to receipt of the Subscribe request from the SP server 10 in T40, the printer 100 transmits the status information repeatedly in accordance with the interval indicated by the frequency information. The status information includes the serial number SN, remaining amount information, accumulated count information and a CTG model number. The remaining amount information indicates a remaining amount of the color material CTG currently installed to the printer 100. The accumulated count information indicates the accumulated number of printed pages that have been printed since first printing after delivery. The CTG model number is a model number of the color material CTG currently installed to the printer 100.

In T44, in response to receipt of the status information from the printer 100 in T42, the SP server 10 stores, in the device table 34, the remaining amount information in the status information as the history information in association with the serial number SN in the status information. At this moment, counting the printed page count using the accumulated count information in the status information is not initiated. That is, at this moment, the printed page count is not stored in the device table 34 in association with the serial number SN in the status information.

In T50, in response to first-time receipt of the status information from the printer 100 after the subscribe request is transmitted in T40, the SP server 10 transmits, to the printer 100, a service permission request for requesting to change the service permission flag of the printer 100 from "OFF" to "ON". The first-time receipt of the status information is a trigger for the transmission of the service permission request. The trigger for the transmission of the service permission request may not be limited to the first-time receipt of the status information. The trigger may also be receipt of the status information multiple times (e.g., two times).

In T52, in response to receipt of the service permission request from the SP server 10, the printer 100 changes the service permission flag from "OFF" to "ON". Here, a possible comparative example would be to change the service permission flag from "OFF" to "ON" in response to the processing in T22 that is a specific operation by the user after the initiation request is transmitted, instead of the processing in T50. In this comparative example, the specific operation would be a trigger for changing the service permission flag. Compared to this comparative example, according to this embodiment, the service permission flag may be changed to "ON" without the above-described user's specific operation, and then the printer 100 may be allowed to print using the dedicated CTG 160. Thus, user convenience may be enhanced. Nevertheless, in other embodiments, the comparative example may be adopted.

Subsequently, in T54, the SP server 10 determines whether the status information received in T42 includes the CTG model number. In a case where neither of the general CTG 150 nor the dedicated CTG 160 is installed to the printer 100 currently, it is determined that the status information does not include the CTG model number. In response to determination that the received status information does not include the CTG model number (NO in T54), the SP server 10 skips determination in T56 described below, and proceeds to T60 of FIG. 3. On the other hand, in a case where the SP server 10 determines that the received status information includes the CTG model number (YES in T54), the SP server 10 proceeds to T56. Nevertheless, in other embodiments, in a case where the status information includes information indicating CTG different from either of the general CTG 150 or the dedicated CTG 160 (e.g., the information indicating a non-genuine CTG), the SP server 10 may determine that the received status information does not include the CTG model number.

In T56, the SP server 10 determines whether the CTG model number in the status information is the CTG model number identifying the dedicated CTG 160. In a case where the CTG model number in the status information includes a character string "SC", the SP server 10 determines that the CTG model number in the status information is the dedicated CTG 160. On the other hand, in a case where the CTG model number in the status information includes a character string "NC" that is other than the character string indicating the dedicated CTG 160, the SP server 10 determines that the CTG model number in the status information is the general CTG 150. In a case where the SP server 10 determines that the CTG model number in the status information is the general CTG 150 (NO in T56), the SP server 10 proceeds to T60 of FIG. 3.

In T60 in FIG. 3, the SP server 10 specifies the dispatching destination information using the stored user-related information UI in association with the user name UN. Subsequently, the SP server 10 transmits the dispatching request including the specified dispatching destination information to the dispatching server 50. Thus, in T62, the dispatching server 50 output notification for notifying the operator that the dedicated CTG 160 should be dispatched to the destination indicated in the received dispatching destination information. Thus, the dedicated CTG 160 is dispatched to the user of the printer 100.

In response to receiving the dedicated CTG 160, in T70, the user of the printer 100 may install the dedicated CTG 160 to the printer 100. Thus, at a timing of the next interval since the dedicated CTG 160 is installed to the printer 100, in T72 the printer 100 transmits the status information including the CTG model number "sc01" identifying the dedicated CTG 160.

In T74, in response to receipt of the status information including the CTG model number "sc01" from the printer 100 in T72, the SP server 10 analyzes information in the status information, and determines that the dedicated CTG 160 has been installed to the printer 100 identified by the serial number SN in the status information. In response to receipt of the status information from the printer 100 in T72, the SP server 10 stores, in the device table 34, remaining amount information in the status information as the history information. The process of T74 is the same or similar to the process of T44. The remaining amount information in the status information received in T72 indicates a remaining amount "100%". Therefore, the SP server 10 does not transmit to the dispatching server 50 the dispatching request for dispatching the dedicated CTG 160.

In T76, the SP server 10 initiates to count the printed page count. More specifically, the SP server 10 determines the number of pages indicated by the accumulated count information in the status information received in T72 as a reference number of pages. Subsequently, each time the status information is received after the process of T72 is executed, the SP server 10 calculates a subtracted count as the printed page count. The subtracted count indicates the difference between the number of pages indicated by the accumulated count information in the status information and the reference number of pages. Then, the SP server 10 stores the calculated printed page count in the device table 34. Thus, the printed page count may be counted. The printed page count is reset to "0" in response to the specific period (e.g., one month) being lapsed since counting the printed page count is initiated.

In T78, the SP server 10 transmits, to an email address in the user-related information UI stored in association with the user name UN, an email message indicating that the flat-rate printing service has been signed-up. According to the email message, the user may recognize that registration in the flat-rate printing service has been completed.

In a case where the SP server 10 determines that the CTG model number in the status information is the dedicated CTG 160 in T56 of FIG. 4 (YES in T56), the SP server 10 skips the processes of T60 to T74, and proceeds to the process T76. That is, the SP server 10 initiates counting the printed page count without transmitting the dispatching request to the dispatching server 50. According to the above-described feature, counting the printed page count may be initiated immediately in a situation where the dedicated CTG 160 has been installed to the printer 100.

It may be assumed that 92% of the color material in the dedicated CTG 160 has been used. The process of T172 is the same or similar to the process of T72, except that the remaining amount information in the status information indicates the remaining amount of "8%".

In T174, the SP server 10 determines whether the latest remaining amount indicated by the latest remaining amount information among the one or more histories of the history information is equal to or less than a threshold value, which may be 10%. In the above-described assumption, the SP server 10 determines that the latest remaining amount (8%) is equal to or less than the threshold value (10%) in T174, and proceeds to T180. T180 is the same as T60, and T182 is the same as T62. In a case where it is determined that the remaining amount is more than the threshold value, the SP server 10 does not execute the process of T180. In other embodiments, another condition, that may be a condition that the amount of change of the remaining amount calculated by a history of the remaining amount information is equal to or more than a prescribed value, may be applied for determining whether the process of T180 is to be executed.

A situation may be assumed that a one-month period has been lapsed since the printed page count was initiated in T76. In this assumption, in T190, the SP server 10 executes a billing process based on the printed page count in the device table 34. The billing process may request the user to pay the flat-rate fee in a case where the printed page count is not more than the predetermined count. Alternatively, the billing process may request the user to pay a total fee including the flat-rate fee and extra fee in a case where the printed page count is more than the predetermined count. In the billing process, the credit card information in the user-related information UI may be used.

(Effects of Embodiment)

A situation may be assumed that the user name UN is deleted in response to user's withdrawal of the flat-rate printing service after initiating the flat-rate printing service. In this assumption, the user may hold the dedicated CTG 160 in a situation where the user has quit the flat-rate printing service. After that, a situation may be assumed that the user signs up the flat-rate printing service again. In this assumption, if the dedicated CTG 160 is dispatched to the user in response to resumption of the flat-rate printing service, the user may hold an extra dedicated CTG 160. In this embodiment, in a case where the SP server 10 determines that the dedicated CTG 160 is not currently installed to the printer 100 (NO in T54 or NO in T56), the dedicated CTG 160 is dispatched to the user (T62 in FIG. 3). On the other hand, in a case where the SP server 10 determines that the dedicated CTG 160 is currently installed to the printer 100 (YES in T56), the dedicated CTG 160 is not dispatched to the user. Therefore, the user may not require to hold the extra dedicated CTG 160.

Furthermore, the SP server 10 transmits the service permission request to the printer 100 after the SP server 10 transmits the subscribe request to the printer 100 (T50 in FIG. 2). For example, a possible comparative example would be to transmit the subscribe request to the printer 100 after the service permission request is transmitted to the printer 100. In this comparative example, the service permission flag is changed from "OFF" to "ON" after the installation of the dedicated CTG 160 to the printer 100 and before the first-time transmission of the status information. That is, the printer 100 may execute the printing process by using color material in the dedicated CTG 160 before the first-time transmission of the status information. For example, if the period between transmission of the service permission request and transmission of the subscribe request is relatively long, the number of pages printed by the color material in the dedicated CTG 160 during the period may be included in the reference number of pages. As a result, a problem that the number of pages printed by the color material in the dedicated CTG 160 during the period is not counted printed page count. In other words, in this comparative example, the number of pages printed by the color material in the dedicated CTG 160 during a period from initiation of transmission of the status information to initiation of the management service is not counted. Compared to this comparative example, according to this embodiment, the service permission request is transmitted after the transmission of the subscribe request, thus the above problem may be avoided.

Furthermore, the SP server 10 initiates counting the printed page count (T76) after the service permission request is transmitted to the printer 100 (T50 in FIG. 2) and after the status information including the CTG model number "sc01" identifying the dedicated CTG 160 is received from the printer 100 (T72 in FIG. 3). That is, the SP server 10 initiates counting the printed page count in a case where it is determined that the dispatched dedicated CTG 160 has been installed to the printer 100 in response to the change of the service permission flag from "OFF" to "ON". Therefore, counting the printed page count is initiated after the printing process by the color material in the dispatched dedicated CTG 160 is initiated.

The management service is an example of a "service". The CTG model number is an example of "cartridge information and identification information". The dedicated CTG 160 is an example of a "first type of color material cartridge". The general CTG 150 is an example of a "second type of color material cartridge". The initiation request in T22 of FIG. 2 is an example of a "initiation request". The subscribe request in T40 is an example of a "transmission request". The service permission request in T50 is an example of a "mode change request". The status information in T72 in FIG. 3 is an example of a "installation notification". The message in the email in T78 is an example of "service initiation information". The process of transmitting the dispatching request to the dispatching server 50 in T60 is an example of a "dispatching process". The mode in which the service permission flag of "ON" is stored is an example of a "first mode". The mode in which the service permission flag of "OFF" is stored is an example of a "second mode". The device which receives the email in T78 is an example of an "external device".

While one embodiment of the present invention has been described in detail, this is merely an example and does not limit the scope of the appended claims. The scope of the claims may include various changes, arrangement and modifications of the embodiment. Hereinafter, several modifications of the above-described embodiment will be described.

(First modification) In the above-described embodiment, the CTG model number is included in the status information (T42 in FIG. 2). Alternatively, the CTG model number may be included in the initiation request of T22. In this modification, the CTG model number included in the initiation request is an example of the "cartridge information".

(Second modification) In the above-described embodiment, the SP server 10 determines whether the CTG model number in the status information is the CTG model number identifying the dedicated CTG 160 (T56 in FIG. 2). Alternatively, the printer 100 may determine whether the CTG model number identifying the color material CTG currently installed to the printer 100 is the CTG model number identifying the dedicated CTG 160. In this modification, the printer 100 may transmit the printer's determination to the SP server 10. In this modification, the SP server 10 may determine whether the dedicated CTG 160 is currently installed to the printer 100 by using the received printer's determination. In this modification, the printer's determination is an example of the "cartridge information".

(Third modification) In the above-described embodiment, the communication system 2 includes the dispatching server 50. Alternatively, the communication system 2 may not necessarily include the dispatching server 50. In this modification, in T60, the SP server 10 may notify an operator that the dedicated CTG 160 is to be dispatched to the destination indicated in the dispatching destination information. In this modification, the notification to the operator is an example of the "dispatching request".

(Fourth modification) In the above-described embodiment, in a case where the dedicated CTG 160 is installed to the printer 100, the printer 100 transmits the status information including the CTG model number "sc01" to the SP server 10 (T72 in FIG. 3). Alternatively, in a case where the dedicated CTG 160 is installed to the printer 100, the printer 100 may transmit the CTG model number "sc01" to the SP server 10 at a specific timing different from the timing when the status information is transmitted based on the interval. In this modification, the CTG model number "sc01" transmitted at the specific timing is an example of the "installation notification".

(Fifth modification) In the above-described embodiment, in response to both of transmission of the service permission request and receipt of the status information including the CTG model number "sc01", the SP server 10 initiates counting the printed page count (T76 in FIG. 3). Alternatively, the SP server 10 may initiate counting the printed page count in response to either of the transmission of the service permission request or the receipt of the status information including the CTG model number "sc01". The SP server 10 may initiate counting of the printed page count before the transmission of the mode change request, or may initiate counting the printed page count before the receipt of the installation notification from the printer 100.

(Sixth modification) The "service initiation information" may not be the message in the email. The "service initiation information" may be a message transmitted by using a messaging function of Social Networking Service ("SNS")

or a message transmitted by using Short Message Service ("SMS"), for example. The "service initiation information" may be a message transmitted to the printer 100. In this modification, the printer 100 is an example of the "external device".

(Seventh modification) In the above-described embodiment, each processing in FIGS. 2 and 3 is implemented by software, e.g., the program 30. Alternatively, the processing in at least one of the steps of FIGS. 2 to 3 may be implemented by hardware, e.g., a logical circuit.

The elements described in the specification and the drawings exhibit technical usability alone or in various combination. The scope of the claims is not limited to those elements. Furthermore, the techniques described in the specification or drawings may achieve a plurality of objects simultaneously, and may include technical utility by achieving any one of these objects.

What is claimed is:

1. A server comprising:
   a controller configured to perform:
      receiving, from a printer, an initiation request for initiating a service, the service being for dispatching a color material cartridge to be installed to the printer;
      receiving, from the printer, cartridge information indicating a color material cartridge currently installed to the printer;
      in response to receiving the initiation request and the cartridge information, determining whether a first type of color material cartridge is currently installed to the printer, the first type of color material cartridge being used at the service; and
      in a case where it is determined that the first type of color material cartridge is not currently installed to the printer, outputting a dispatching request causing a dispatching process for dispatching the first type of color material cartridge,
   wherein the dispatching request is not outputted in a case where it is determined that the first type of color material cartridge is currently installed to the printer.

2. The server according to claim 1, wherein
   the printer is configured to implement printing process by using either of a plurality of color material cartridges including the first type of color material cartridge and a second type of color material cartridge different from the first type of color material cartridge,
   the printer is configured to operate in a first mode or a second mode,
   in the first mode, the first type of color material cartridge is allowed to be used in the printer, and
   in the second mode, the first type of color material cartridge is not allowed to be used and the second type of color material cartridge is allowed to be used in the printer.

3. The server according to claim 2, wherein
   the controller is further configured to perform:
      transmitting, to the printer, a mode change request for changing a mode from the second mode to the first mode in response to receiving the initiation request from the printer.

4. The server according to claim 3, wherein
   the controller is further configured to perform:
      transmitting a transmission request to the printer in response to receiving the initiation request from the printer, the transmission request being for requesting the printer to transmit status information indicating a current status of the printer repeatedly,
   wherein the controller transmits the mode change request to the printer in response to receiving the status information from the printer after the transmission request is transmitted to the printer.

5. The server according to claim 4, wherein
   the status information includes the cartridge information.

6. The server according to claim 3, wherein
   the service includes management of the number of printed pages by a color material in the first type of color material cartridge,
   the controller is further configured to perform:
      receiving, from the printer, an installation notification indicating that the dispatched first type of color material cartridge has been installed to the printer after implementing the dispatching process in response to determining that the first type of color material cartridge is not currently installed to the printer; and
      initiating counting the number of printed pages after transmitting the mode change request to the printer and receiving the installation notification from the printer.

7. The server according to claim 6, wherein
   the controller is further configured to perform:
      transmitting, to an external device, service initiation information indicating an initiation of the service in a case where counting the number of printed pages is initiated.

8. The server according to claim 2, wherein
   the controller determines that the first type of color material cartridge is currently installed to the printer based on the cartridge information indicating that the first type of color material cartridge is currently installed to the printer, and
   the controller determines that the first type of color material cartridge is not currently installed to the printer based on the cartridge information indicating that the second type of color material cartridge is currently installed to the printer.

9. The server according to claim 8, wherein
   the controller determines that the first type of color material cartridge is not currently installed to the printer based on the cartridge information indicating that neither the first type of color material cartridge nor the second type of color material cartridge is currently installed to the printer.

10. The server according to claim 1, wherein
    the controller determines that the first type of color material cartridge is currently installed to the printer based on identification information included in the cartridge information, the identification information indicating a color material cartridge currently installed to the printer, the identification information identifying the first type of color material cartridge, and
    the controller determines that the first type of color material cartridge is not currently installed to the printer based on identification information included in the cartridge information, the identification information indicating a color material cartridge currently installed to the printer, the identification information identifying other than the first type of color material cartridge.

11. The server according to claim 1, wherein
    the service includes management of the number of printed pages with the first type of color material cartridge, and
    the controller is further configured to perform:

initiating counting the number of printed pages in a case where it is determined that the first type of color material cartridge is currently installed to the printer.

12. The server according to claim 11, wherein
the controller is further configured to perform:
transmitting, to an external device, service initiation information indicating an initiation of the service in a case where counting the number of printed pages is initiated.

13. A non-transitory computer readable storage medium storing instructions, the instructions, when executed by the controller, causing the server to perform:
receiving, from a printer, an initiation request for initiating a service, the service being for dispatching a color material cartridge to be installed to the printer;
receiving, from the printer, cartridge information indicating a color material cartridge currently installed to the printer;
in response to receiving the initiation request and the cartridge information, determining whether a first type of color material cartridge is currently installed to the printer, the first type of color material cartridge being used at the service; and
in a case where it is determined that the first type of color material cartridge is not currently installed to the printer, outputting a dispatching request causing a dispatching process for dispatching the first type of color material cartridge,
wherein the dispatching request is not outputted in a case where it is determined that the first type of color material cartridge is currently installed to the printer.

14. A method comprising:
transmitting, to a server providing a service, an initiation request for initiating a service, from a printer, the service being for dispatching a color material cartridge to be installed to the printer;
determining whether a first type of color material cartridge is currently installed to the printer, the first type of color material cartridge being used at the service; and
in a case where the initiation request is transmitted from the server to the printer and where it is determined that the first type of color material cartridge is not currently installed to the printer, outputting a dispatching request causing a dispatching process for dispatching the first type of color material cartridge,
wherein the dispatching request is not outputted in a case where it is determined that the first type of color material cartridge is currently installed to the printer.

\* \* \* \* \*